(12) United States Patent
Robertson et al.

(10) Patent No.: US 10,002,089 B2
(45) Date of Patent: Jun. 19, 2018

(54) INTERRUPT-CONTROLLED DIRECT MEMORY ACCESS PERIPHERAL DATA TRANSFER

(71) Applicant: Freescale Semiconductor, Inc., Austin, TX (US)

(72) Inventors: Alistair Paul Robertson, Glasgow (GB); Mark Maiolani, Glasgow (GB); Robert Freddie Moran, North Ayrshire (GB)

(73) Assignee: NXP USA, Inc., Austin, TX (US)

( * ) Notice: Subject to any disclaimer, the term of this patent is extended or adjusted under 35 U.S.C. 154(b) by 256 days.

(21) Appl. No.: 14/939,062

(22) Filed: Nov. 12, 2015

(65) Prior Publication Data
US 2017/0139863 A1     May 18, 2017

(51) Int. Cl.
*G06F 13/24* (2006.01)
*G06F 13/34* (2006.01)
*G06F 12/1081* (2016.01)
*G06F 13/40* (2006.01)
*G06F 12/0862* (2016.01)

(52) U.S. Cl.
CPC .......... *G06F 13/34* (2013.01); *G06F 12/0862* (2013.01); *G06F 12/1081* (2013.01); *G06F 13/24* (2013.01); *G06F 13/4022* (2013.01); *G06F 2212/602* (2013.01); *G06F 2212/656* (2013.01)

(58) Field of Classification Search
USPC ................................................. 710/260–269
See application file for complete search history.

(56) References Cited

U.S. PATENT DOCUMENTS 5,530,873 A * 6/1996 Takano ................. G06F 9/3861
703/26
8,135,894 B1 * 3/2012 Ball ....................... G06F 13/26
710/264
(Continued)

OTHER PUBLICATIONS

Freescale Semiconductor, Inc., "P4080 QorIQ Multicore Communication Processor Reference Manual," Document No. P4080RM, Rev. 2, May 2014, pp. 1631-1650.
(Continued)

*Primary Examiner* — Raymond Phan (57) ABSTRACT

An interrupt controlled prefetching and caching technique includes transferring peripheral data from a peripheral to a peripheral cache via direct memory access in response to receiving an interrupt request from the peripheral. The technique includes executing an interrupt service routine prologue in response to completion of transferring of peripheral data. The technique may include providing a base address and a transfer trigger to initiate the transferring of the peripheral data. The technique may include executing a peripheral interrupt service routine after executing the interrupt service routine prologue. The technique may include executing an interrupt service routine epilogue after executing the peripheral interrupt service routine, the interrupt service routine epilogue including resetting an interrupt status flag associated with the interrupt request. Executing the interrupt service routine may include executing instructions using the peripheral data at a rate at least an order of magnitude faster than an access time of the peripheral.

11 Claims, 4 Drawing Sheets

(56) References Cited

U.S. PATENT DOCUMENTS 8,510,482 B2 * 8/2013 Circello ............... G06F 13/28
710/1
2012/0331186 A1 * 12/2012 Nagai ................ G06F 13/28
710/22

OTHER PUBLICATIONS

Freescale Semiconductor, Inc., "QorIQ Data Path Acceleration Architecture (DPAA) Reference Manual," DPAARM, Rev. 2, Nov. 2011, 1557 pages.

* cited by examiner

INTERRUPT-CONTROLLED DIRECT MEMORY ACCESS PERIPHERAL DATA TRANSFER

BACKGROUND

Field of the Invention

This invention relates to processing systems and, more particularly, to data transfers between peripheral systems and processing systems.

Description of the Related Art

In general, processing systems (e.g., microcontrollers) include central processing units that are increasingly capable of processing operations at a high rate (e.g., hundreds of MHz). However, the frequency of operation of peripheral devices remains relatively constant at rates lower than the frequency of operation of central processing units (e.g., less than 100 MHz). As the difference between central processing unit throughput and peripheral throughput increases, the time for a central processing unit to access peripheral data increasingly impacts actual central processing unit throughput. For example, a central processing unit having a 300 MHz clock rate accessing a peripheral having a 30 MHz clock rate and requiring a three cycle read-access time needs a minimum of 30 central processing unit clock cycles per read of the peripheral. A system may address this problem by including a dedicated input/output processor core that has performance more closely matched to the peripheral performance and is adapted for peripheral access. However, such techniques require implementation of substantial software overhead, which may be difficult for a customer to implement. As a result, although microcontroller manufacturers make resources available to improve performance, the customer may not use those resources. Accordingly, improved techniques for interfacing between a central processing unit and peripheral devices are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A prefetching and caching technique reduces the performance impact of central processing unit accesses of slower peripherals via an interrupt controlled peripheral interface by using a peripheral interface including an interrupt controlled prefetching and caching mechanism. The technique delays signaling of a central processing unit interrupt received from a peripheral, and implements an associated direct memory access that stores prefetched peripheral data in a peripheral cache memory that has an access time substantially less than an access time of the peripheral. The prefetching and caching mechanism may be transparent to software executing on the central processing unit. The prefetching and caching mechanism maintains coherency of the peripheral cache with the peripheral by using interrupt status flags to invalidate peripheral data stored in the peripheral cache using a write-through write policy. The prefetching and caching mechanism uses user selectable configuration information to selectively enable the technique for non-latency sensitive peripherals.

Figure 1:
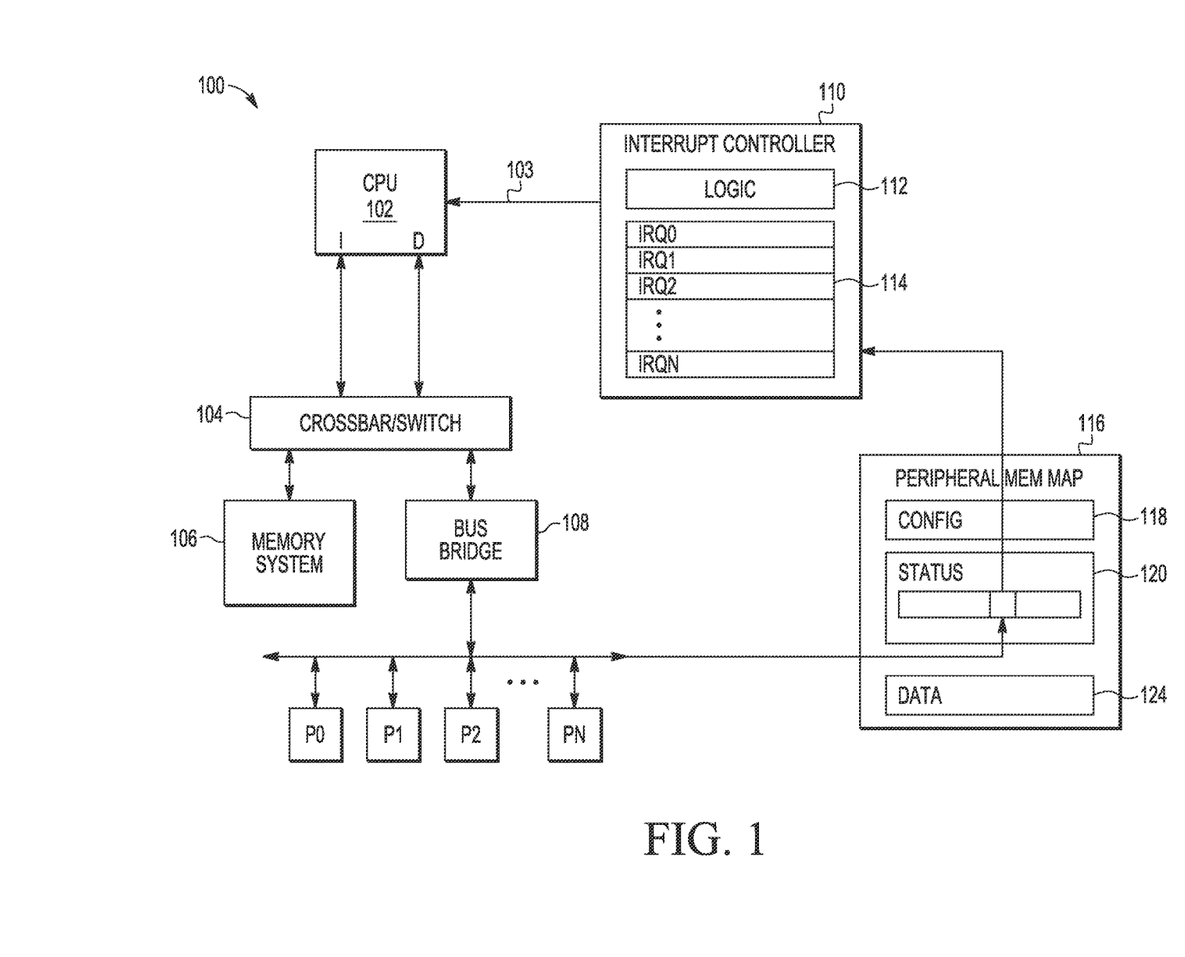
FIG. 1 illustrates an exemplary processing system including an interrupt controlled peripheral interface.

Referring to FIG. 1, in exemplary processing system 100, central processing unit 102 processes instructions and data transferred between memory system 106 and central processing unit 102 via crossbar switch 104. Bus bridge 108 is a peripheral bus or input/output bus that facilitates data transfers via crossbar 104 between central processing unit 102, a high-speed system, and a lower-speed system, (e.g., one of peripherals P0, P1, P2, . . . , PN or other lower speed subsystem). Peripheral memory map 116 stores peripheral control information in storage elements 118, 120, and 124, which include configuration information, status information, and other data, respectively, associated with each of peripherals P0, P1, P2, . . . , and PN. One or more of peripherals P0, P1, P2, . . . , PN interact with central processing unit 102 via external interrupt control. Such architecture allows system 100 to multi-task, e.g., central processing unit 102 may execute other processes while waiting for a slower peripheral device.

For example, peripheral P1 may be a communications peripheral, timer peripheral, networking peripheral, processing peripheral, or other peripheral that is configured to interrupt central processing unit 102 after collecting a predetermined amount of data received over a transmission line or wireless interface. Peripheral P1 sets a status flag in status register 120 to indicate to interrupt controller 110 that peripheral P1 is ready to transfer data for processing by central processing unit 102. Interrupt controller 110 may use vectored interrupts and may provide a location of the corresponding interrupt service routine to central processing unit 102 in response to a particular interrupt status bit being set by peripheral P1. Each peripheral may be assigned a separate status bit in status register 120 and a corresponding vector in storage element 114. Accordingly, when peripheral P1 sets the status bit corresponding to peripheral P1, interrupt controller 110 provides the contents of the corresponding vector location stored in storage element 114. In other embodiments, interrupt controller 110 implements polled interrupts or uses a level-triggered shared interrupt signal line, or other suitable interrupt handling mechanism.

Interrupt controller 110 includes storage elements 114, which may include interrupt priority information and interrupt vector information. Each of peripherals P0, P1, P2, . . . , and PN may have one or more corresponding locations IRQ0, IRQ1, IRQ2, . . . , and IRQN, in storage element 114. Logic 112 uses the contents of storage element 114 to prioritize concurrent interrupts and to provide an external interrupt indicator, interrupt identifier, vector address, or combination thereof, to central processing unit 102. In response to external interrupt signal 103 generated by interrupt controller 110 indicating a pending interrupt, central processing unit 102 pauses execution of a current instruction sequence and changes program flow to handle the interrupt.

Figure 4:
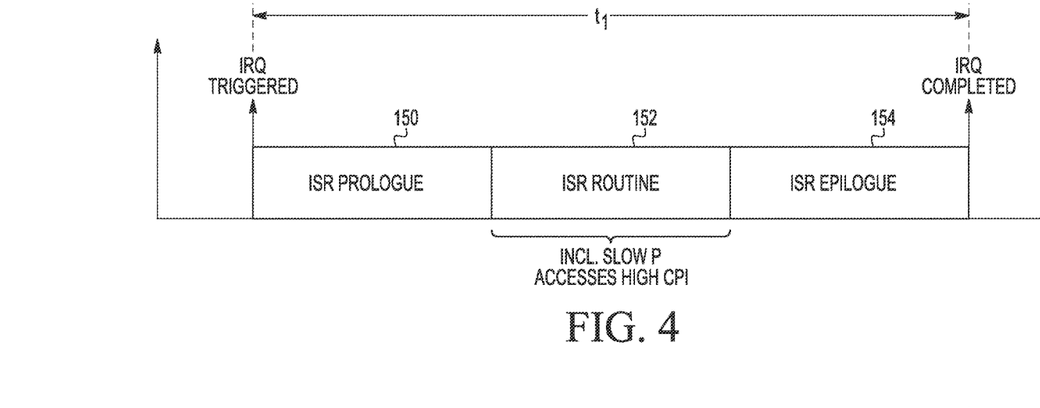
FIG. 4 illustrates an exemplary timing diagram for the interrupt controlled peripheral interface of FIG. 1.

Referring to FIGS. 1 and 4, in response to central processing unit 102 receiving the indication of an external interrupt (e.g., detecting a transition on external interrupt line 103), central processing unit 102 executes interrupt service routine prologue 150, which may be a generic set or interrupt-specific set of instructions that central processing unit 102 uses to prepare for executing an interrupt-specific interrupt service routine 152. Interrupt service routine prologue 150 may include one or more sequences of instructions that save the state of central processing unit 102, including information stored in any program counter, stack pointer, status registers, machine registers, or other machine state information of central processing unit 102. After completion of interrupt service routine prologue 150, central processing unit 102 executes an interrupt-specific interrupt service routine, which may be a set of instructions identified by a vector provided by interrupt controller 110 or provided by other suitable technique. Typical interrupt service routines include reading data from a particular peripheral device, processing those data, and storing the results. Typically, the peripheral read accesses are slow as compared to the throughput of central processing unit 102. Upon completion of interrupt service routine 152, central processing unit 102 executes interrupt service routine epilogue 154, which restores the pre-interrupt state of central processing unit 102 from memory, clears the external interrupt, and causes central processing unit 102 to return from the interrupt servicing and to resume pre-interrupt instruction sequence execution. Note that while central processing unit 102 executes interrupt service routine prologue 150, interrupt service routine 152, and interrupt service routine epilogue 154, central processing unit 102 is prevented from multi-tasking and servicing other sequences of instructions. In addition, central processing unit 102 may be otherwise uninterruptable during this time.

Figure 2:
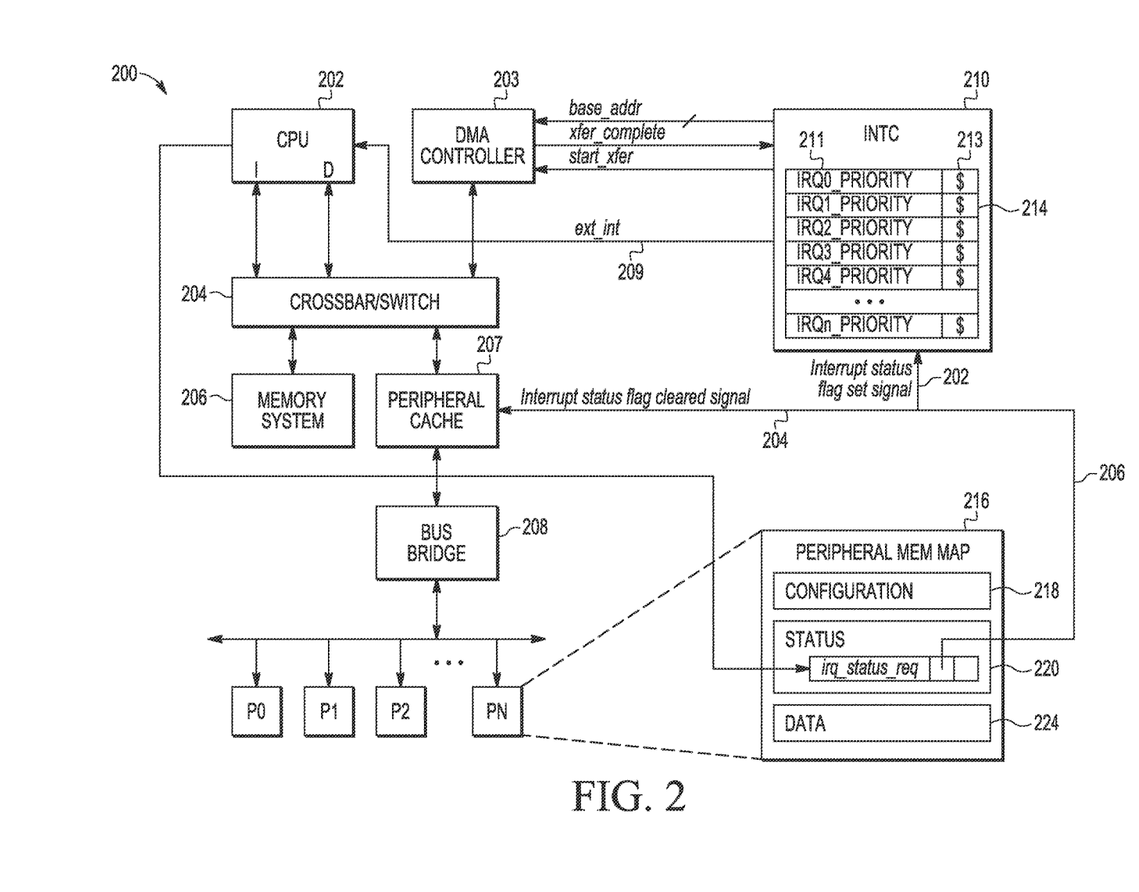
FIG. 2 illustrates an exemplary processing system including a prefetching and caching mechanism for an interrupt controlled peripheral interface consistent with at least one embodiment of the invention.

Referring to FIG. 2, system 200 includes an interrupt controlled prefetching and caching mechanism that prefetches and caches peripheral data content to a peripheral cache. Peripheral cache 207 is a memory that has an access time substantially less (e.g., an order of magnitude less) than an access time of a corresponding peripheral. The interrupt controlled prefetch and caching mechanism reduces the performance impact of an external interrupt on the throughput of central processing unit 202 when accessing substantially slower (e.g., an order of magnitude slower) peripherals. System 200 includes direct memory access controller 203 that receives control signals (e.g., a base address and a start transfer trigger signal) from interrupt controller 210 in response to an interrupt received from one of peripherals P0, P1, P2, . . . , PN. The direct memory access is a feature that allows a hardware subsystem of system 200 to access the peripherals or other subsystem independently from central processing unit 202. Direct memory access controller 203 transfers data from the interrupting peripheral to peripheral cache 207 in parallel with ongoing program execution of central processing unit 202.

Peripheral cache 207 may be a dedicated cache that is coupled to central processing unit 202 via crossbar/switch 204, out of critical speed paths of system 200, and out of the data path between central processing unit 202 and memory system 206. Direct memory access controller 203 transfers data between an interrupting peripheral of peripherals P0, P1, P2, . . . , and PN and peripheral cache 207, starting at a location in peripheral cache 207 identified by interrupt controller 210. In at least one embodiment, to maintain coherency between peripheral cache 207 and the peripheral, and to reduce effects of prefetching and caching technique on central processing unit 202, peripheral cache 207 is a write-through cache that synchronously writes data from central processing unit 202 to the cache and the associated peripheral. Peripheral cache 207 may be partitioned into a predetermined storage space for each peripheral. The predetermined storage space may be identified by at least the base address provided by interrupt controller 210 to direct memory access controller 203. The size of the data transfer may be predetermined or identified by control information provided by interrupt controller 210 to direct memory access controller 203. Direct memory access controller 203 transfers data between the identified peripheral and peripheral cache 207.

Interrupt controller 210 may include a prefetching and caching enable bit 213 for each peripheral. Prefetching and caching enable bit 213 may be configured to selectively enable the prefetching of peripheral data into a peripheral cache memory by a predetermined configuration stored in memory or using any suitable user interface. When enabled, the prefetching and caching mechanism delays signaling of central processing unit 202 of occurrence of an external interrupt received from a corresponding peripheral. A peripheral that is suitable for use of the prefetching and caching mechanism is insensitive to latency, is not adversely affected by a read operation, and has a central processing unit to peripheral access time that is substantially greater than (e.g., at least an order of magnitude greater than) the peripheral cache access time. However, other peripherals may be suitable for use of the prefetching and caching mechanism under one or more other conditions.

While the peripheral data is being transferred to peripheral cache 207 by direct memory access controlled by direct memory access controller 203, central processing unit 202 continues to execute the instruction sequence it was executing prior to the interrupting peripheral triggering an external interrupt via status registers 220. Upon completion of the peripheral data transfer, direct memory access controller 203 sends an indication thereof to interrupt controller 210. In response to that direct memory access transfer completion indicator, interrupt controller 210 triggers an external interrupt of central processing unit 202, e.g., by appropriately setting, resetting, or toggling external interrupt signal 209.

Figure 5:
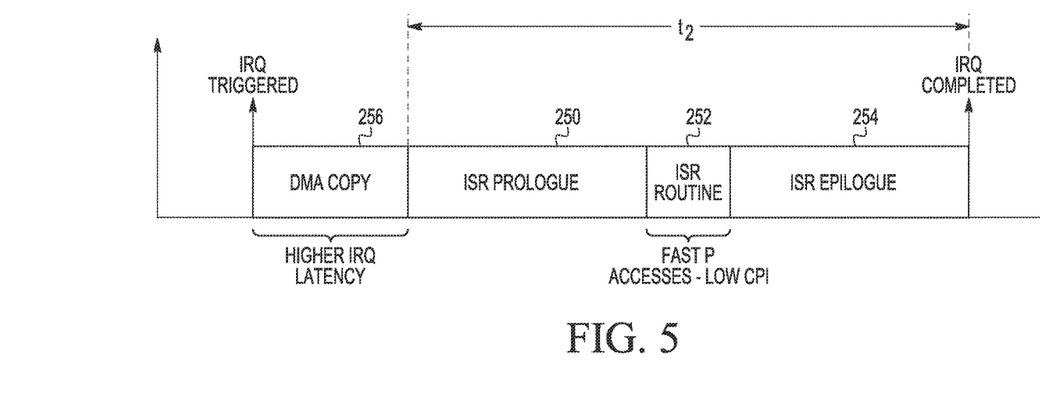
FIG. 5 illustrates an exemplary timing diagram for the prefetching and caching mechanism of an interrupt controlled peripheral interface of FIG. 2 consistent with at least one embodiment of the invention.

Referring to FIGS. 2, 4, and 5, after receiving the indication of the external interrupt from interrupt controller 210, central processing unit 202 executes interrupt service routine prologue 250, interrupt service routine 252, and interrupt service routine epilogue 254. Note that the interrupt service routine 252 executed by system 200 executes much more quickly than interrupt service routine 152 executed by system 100. Accordingly, the total interrupt handling time t2 of central processing unit 202 in system 200 is faster than the total interrupt handling time t1 of central processing unit 102 in system 100 since the peripheral data already resides in peripheral cache 207 of system 200 and may be accessed substantially faster by interrupt service routine 252 than accessing that data directly from the peripheral, as done by interrupt service routine 152 of system 100. Accordingly, handling an external interrupt by central processing unit 202 prevents central processing unit 202 from multi-tasking and servicing other sequences of instructions or interrupt requests for a shorter period of time than central processing unit 102 of system 100.

Note that the elapsed time from when a peripheral interrupt is generated to the time a central processing unit services the peripheral interrupt, known as the interrupt latency of the system, is greater for system 200 than for system 100 (e.g., by the amount of time needed to perform the direct memory access transfer). However, the increased availability of central processing unit 202, when the prefetching and caching mechanism is enabled, as compared to the availability of central processing unit 102 increases the overall performance of system 200 as compared to system 100. In at least one embodiment of system 200, interrupt service routine 252 is the same instruction sequence as interrupt service routine 152, but configured with a different target location for accessing the peripheral data from peripheral cache 207. The interrupt service routines executed by system 200 may include at least one cache coherency instruction that invalidates cached peripheral data. In other embodiments of system 200, resetting the interrupt status flag may automatically invalidate cached peripheral data in peripheral cache 207.

Figure 3:
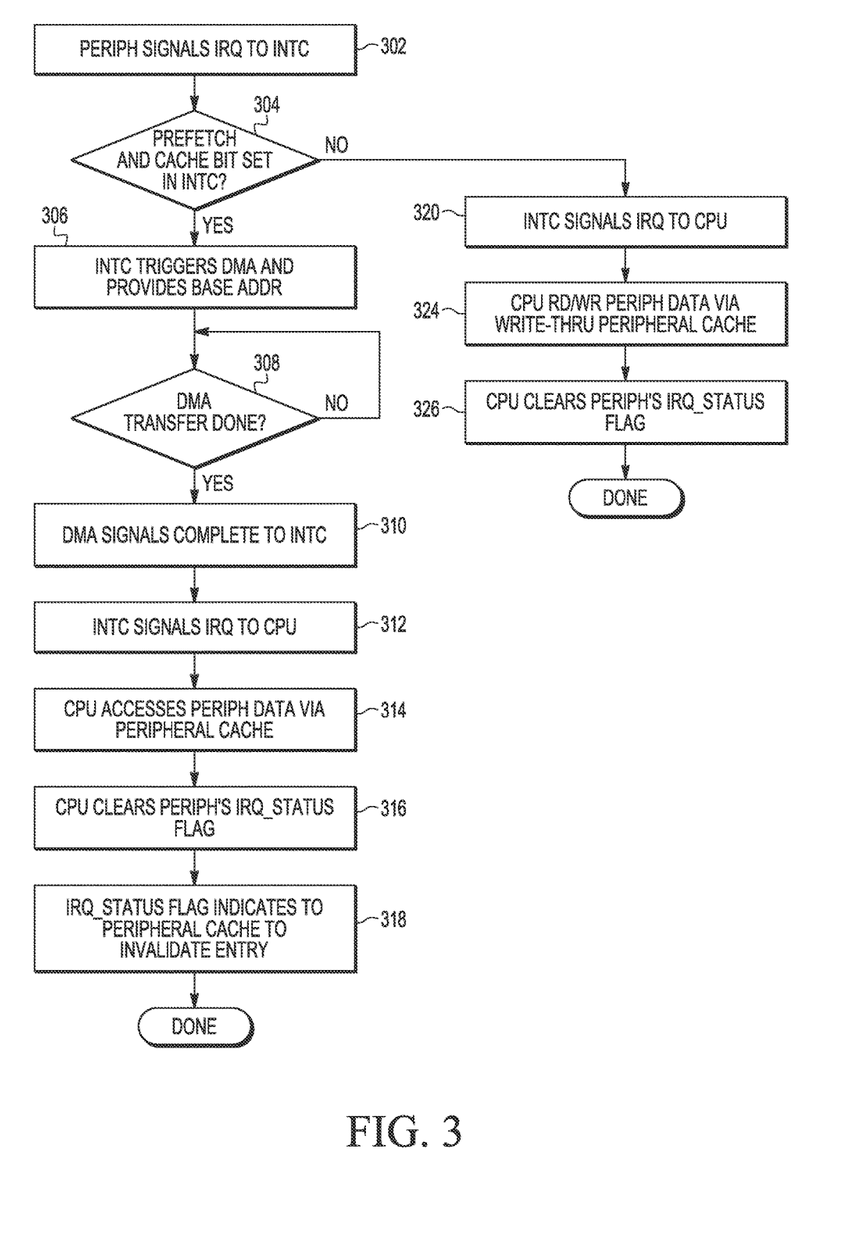
FIG. 3 illustrates exemplary information and control flows for the prefetching and caching mechanism of the interrupt controlled peripheral interface of FIG. 2 consistent with at least one embodiment of the invention.

Referring to FIGS. 2 and 3, exemplary information and control flows for the prefetching and caching mechanism of system 200 includes central processing unit 202 executing an instruction sequence or idling when one of peripherals P0, P1, P2, . . . , PN signals an interrupt to interrupt controller 210, e.g., by toggling an interrupt signal line that causes an interrupt state bit to be toggled (302). Interrupt controller 210 determines whether or not the prefetching and caching mechanism is enabled for the interrupting peripheral by checking the state of a corresponding prefetching and caching enable bit 213 in storage 214 (304). If the prefetching and caching mechanism is enabled for that peripheral, then interrupt controller 210 triggers direct memory access controller 203 to start a direct memory access transfer from the peripheral and provides direct memory access controller 203 with a base address for identifying one or more storage locations in peripheral cache 207 associated with the transfer (306). Direct memory access controller 203 continues the transfer until completed (308).

When the transfer is complete, direct memory access controller 203 provides an indication of the transfer completion to interrupt controller 210 (310). If the transfer is a read of the peripheral device, then peripheral cache 207 contains the target peripheral data at this time. Interrupt controller 210 then issues an indicator of the interrupt to central processing unit 202. For example, interrupt controller 210 asserts an external interrupt line coupled to central processing unit 202 (312). In response to detecting the external interrupt, central processing unit 202 accesses the peripheral data stored in peripheral cache 207 (314). Since peripheral cache 207 is a write-through cache, the access is to peripheral cache 207 rather than a direct peripheral access via bus bridge 208. After accessing the peripheral data in peripheral cache 207, central processing unit 202 clears the interrupt status flag in status register 220 (316). In response to the interrupt status flag being cleared, peripheral cache 207 invalidates the entries in peripheral cache 207 (318). By invalidating the contents of peripheral cache 207, those storage locations are available for other uses (e.g., use by another peripheral interrupt from that peripheral or other peripherals), thereby reducing the required size of peripheral cache 207 for a target application.

If the prefetching and caching mechanism is not enabled for the interrupting peripheral (304), then system 200 handles the interrupt similarly to the peripheral interrupt handling of system 100, e.g., with a similar latency and instruction throughput as system 100. For example, interrupt controller 210 indicates the occurrence of an external interrupt using external interrupt signal 209 provided to central processing unit 202 (320). In response to external interrupt signal 209 indicating the peripheral interrupt, central processing unit 202 accesses the corresponding peripheral via peripheral cache 207 (324). After accessing the peripheral data, central processing unit 202 clears the interrupt status flag in status register 220 and invalidates entries in peripheral cache 207 (326).

The techniques described herein provide solutions to a performance limitation of an exemplary low-power, microcontroller design. The techniques are consistent with multi-level cache-based solutions for handling system memories and may be transparent to software, which allows for software reuse. Further, peripheral cache 207 operates as a write-through cache, permitting data written to high speed cache to be pushed to the low speed peripheral space. The speedup of central processing unit 202 by the peripheral caching technique described herein may be substantial enough that even if inclusion of the peripheral cache 207 adds a cycle due to cache misses, that penalty would result in negligible system impact.

In at least one embodiment of the invention, a method includes transferring peripheral data from a peripheral to a peripheral cache via direct memory access in response to receiving an interrupt request from the peripheral. The method includes executing an interrupt service routine prologue in response to completion of the transferring of peripheral data. The method may include providing a base address and a transfer trigger to initiate the transferring of the peripheral data. The method may include executing a peripheral interrupt service routine after executing the interrupt service routine prologue. The method may include executing an interrupt service routine epilogue after executing the peripheral interrupt service routine, the interrupt service routine epilogue including clearing or negating an interrupt status flag associated with the interrupt request. The executing the interrupt service routine may include executing instructions using the peripheral data at a rate at least an order of magnitude faster than an access time of the peripheral. The method may include invalidating contents of the peripheral cache in response to the interrupt status flag being cleared or negated. The method may include receiving the interrupt request from the peripheral. The transferring may be further in response to a peripheral direct memory access caching flag indicating the peripheral is direct-memory-access-cached.

The method may include receiving a second interrupt request from a second peripheral in response to a second peripheral direct memory access caching flag indicating the second peripheral is not direct-memory-access-cached the method may include executing the interrupt service routine prologue, executing a peripheral interrupt service routine including accessing peripheral data from the second peripheral via the peripheral cache, and executing an interrupt service routine epilogue after executing the peripheral interrupt service routine. In response to the peripheral direct memory access caching flag indicating the peripheral is direct-memory-access-cached, the method may include triggering the transferring of the peripheral data and providing a base address for the transferring, signaling completion of the transferring to trigger executing the interrupt service routine epilogue, executing a peripheral interrupt service routine after executing the interrupt service routine prologue, and executing an interrupt service routine epilogue after executing the peripheral interrupt service routine. The interrupt service routine epilogue may include clearing or negating an interrupt status flag and invalidating peripheral cache entry. The executing the peripheral interrupt service routine may include maintaining coherency of the peripheral cache with the peripheral. The peripheral cache may be a write-through cache.

In at least one embodiment of the invention, an apparatus includes a processor responsive to an external interrupt signal, a peripheral cache, a direct memory access controller configured to transfer peripheral data between a peripheral and the peripheral cache in response to a direct memory access transfer trigger, and an interrupt controller configured to provide the external interrupt signal to the processor in response to completion of a direct memory access transfer of peripheral data between the peripheral and the peripheral cache. The interrupt controller may be further configured to selectively provide a base address and a direct memory access transfer trigger to the direct memory access controller according to an interrupt priority indication for the peripheral and a peripheral direct memory access caching enable indication for the peripheral in response to an interrupt request received from the peripheral. The interrupt controller may include an interrupt priority storage element configured to store the interrupt priority indication for the peripheral. The interrupt controller may include a peripheral direct memory access caching enable storage element configured to store the peripheral direct memory access caching enable indication for the peripheral. The interrupt controller may be further configured to reset the external interrupt signal and to invalidate the peripheral cache in response to an indication of completion of external interrupt handling from the processor. The apparatus may include an interrupt status register comprising a flag configured to indicate a pending interrupt request from the peripheral. The apparatus may include the peripheral configured to issue an interrupt request. The processor may execute instructions at a rate at least an order of magnitude greater than a read access rate of the peripheral. The processor may be configured to access peripheral data via the peripheral cache. The peripheral cache may be a write-through cache. The apparatus may include peripheral configuration registers.

In at least one embodiment of the invention, a method includes, in response to an interrupt request from a peripheral and the peripheral being direct memory access cached: transferring, peripheral data from the peripheral to a peripheral cache using direct memory access, and executing an interrupt service routine prologue by a processor in response to an indication of peripheral data transfer completion. The method includes, in response to the interrupt request from the peripheral and the peripheral not being direct memory access cached: executing an interrupt service routine prologue, executing a peripheral interrupt service routine by the processor after execution of the interrupt service routine prologue. Executing the peripheral interrupt service routine includes write-through accessing of peripheral data from the peripheral via the peripheral cache. The processor may execute instructions at a rate at least an order of magnitude faster than a read access rate of the peripheral.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware of combinations thereof.

Although the invention is described herein with reference to specific embodiments, various modifications and changes can be made without departing from the scope of the present invention as set forth in the claims below. For example, while the invention has been described in an embodiment in which peripherals interrupt a central processing unit, one of skill in the art will appreciate that the teachings herein can be utilized with subsystems integrated with the central processing unit performing tasks on the other side of bus bridge 208 but having an access time substantially slower than an access time of peripheral cache 207. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:
1. A method comprising:
transferring peripheral data from a peripheral to a peripheral cache via direct memory access in response to receiving an interrupt request from the peripheral;
executing an interrupt service routine prologue in response to completion of the transferring of peripheral data;
executing a peripheral interrupt service routine after executing the interrupt service routine prologue; and
executing an interrupt service routine epilogue after executing the peripheral interrupt service routine, the interrupt service routine epilogue including negating an interrupt status flag associated with the interrupt request.
2. The method, as recited in claim 1, further comprising:
providing a base address and a transfer trigger to initiate the transferring of the peripheral data.
3. The method, as recited in claim 1, wherein executing the interrupt service routine includes executing instructions using the peripheral data at a rate at least an order of magnitude faster than an access time of the peripheral.
4. The method, as recited in claim 1, further comprising:
invalidating contents of the peripheral cache in response to the interrupt status flag being negated.
5. The method, as recited in claim 1, further comprising:
receiving the interrupt request from the peripheral,
wherein the transferring is further in response to a peripheral direct memory access caching flag indicating the peripheral is direct-memory-access-cached.
6. A method comprising:
transferring peripheral data from a peripheral to a peripheral cache via direct memory access in response to receiving an interrupt request from the peripheral;

executing an interrupt service routine prologue in response to completion of the transferring of peripheral data;

receiving a second interrupt request from a second peripheral; and in response to a second peripheral direct memory access caching flag indicating the second peripheral is not direct-memory-access-cached:
  executing the interrupt service routine prologue,
  executing a peripheral interrupt service routine including accessing peripheral data from the second peripheral via the peripheral cache, and
  executing an interrupt service routine epilogue after executing the peripheral interrupt service routine.

7. The method, as recited in claim 1, wherein executing the peripheral interrupt service routine includes maintaining coherency of the peripheral cache with the peripheral.

8. The method, as recited in claim 1, wherein the peripheral cache is a write-through cache.

9. A method comprising:
  transferring peripheral data from a peripheral to a peripheral cache via direct memory access in response to receiving an interrupt request from the peripheral;
  executing an interrupt service routine prologue in response to completion of the transferring of peripheral data; and
  in response to a peripheral direct memory access caching flag indicating the peripheral is direct-memory-access-cached:
    triggering the transferring of the peripheral data and providing a base address for the transferring,
    signaling completion of the transferring to trigger executing the interrupt service routine epilogue,
    executing a peripheral interrupt service routine after executing the interrupt service routine prologue, and
    executing an interrupt service routine epilogue after executing the peripheral interrupt service routine, the interrupt service routine epilogue including negating an interrupt status flag and invalidating peripheral cache entry.

10. A method comprising:
  in response to an interrupt request from a peripheral and the peripheral being direct memory access cached:
    transferring peripheral data from the peripheral to a write-through peripheral cache using direct memory access; and
    executing an interrupt service routine prologue by a processor in response to an indication of peripheral data transfer completion; and
  in response to the interrupt request from the peripheral and the peripheral not being direct memory access cached:
    executing an interrupt service routine prologue;
    executing a peripheral interrupt service routine by the processor after execution of the interrupt service routine prologue, wherein executing the peripheral interrupt service routine includes accessing of peripheral data from the peripheral via the write-through peripheral cache.

11. The method, as recited in claim 10, wherein the processor executes instructions at a rate at least an order of magnitude faster than a read access rate of the peripheral.

* * * * *